United States Patent [19]
McGuire et al.

[11] Patent Number: 5,836,429
[45] Date of Patent: Nov. 17, 1998

[54] BRAKE SHOE PIN AND PREASSEMBLED SPRING AND CUP ASSEMBLY

[75] Inventors: James T. McGuire; Curtis Freeberg, both of Byron, Ill.

[73] Assignee: Textron, Inc., Providence, R.I.

[21] Appl. No.: 589,376

[22] Filed: Jan. 22, 1996

[51] Int. Cl.⁶ .................................................. F16D 51/00
[52] U.S. Cl. ............................................ 188/340; 188/78
[58] Field of Search ............................... 188/340, 250 A, 188/250 G, 250 F, 78, 382, 234

[56] References Cited

U.S. PATENT DOCUMENTS

| 3,795,292 | 3/1974 | Keller, Jr. .................................. | 188/340 |
| 5,368,139 | 11/1994 | Pirrallo et al. ....................... | 188/340 X |

FOREIGN PATENT DOCUMENTS

| 2205909 | 12/1988 | United Kingdom .................... | 188/340 |

OTHER PUBLICATIONS

Service Manual Labled 208.CHBK.
Photographs of Bendix Drum Hardware and CTA® Brake Spring Compressor.

*Primary Examiner*—Peter M. Poon
*Attorney, Agent, or Firm*—Trexler, Bushnell, Giangiorgi & Blackstone, Ltd.

[57] ABSTRACT

A preassembled spring and cup assembly is used in a brake assembly. The spring and cup assembly includes a cup which is engaged against a spring. The cup has a slot therethrough through which a pin is passed to retain the pin with the cup and to retain the preassembled spring and cup assembly with the brake assembly. The cup further includes at least one indent in which the pin is releasably retained. The assembly further includes structure for retaining the spring in a compressed condition. The retaining structure is capable of being selectively released to allow the spring to expand. In a first embodiment, the retaining structure is an arm portion which is integrally formed with the spring and extends upwardly to the cup to engage the cup through an opening in the cup. The pin is used to release the retaining structure. In a second embodiment, a base stamping is provided which is attached to the second end of the spring. Arm portions extend upwardly from the base stamping to the cup and engage the cup. The cup is pressed on to compress the spring so as to allow the arm portions to move away from their engagement with the cup.

26 Claims, 9 Drawing Sheets

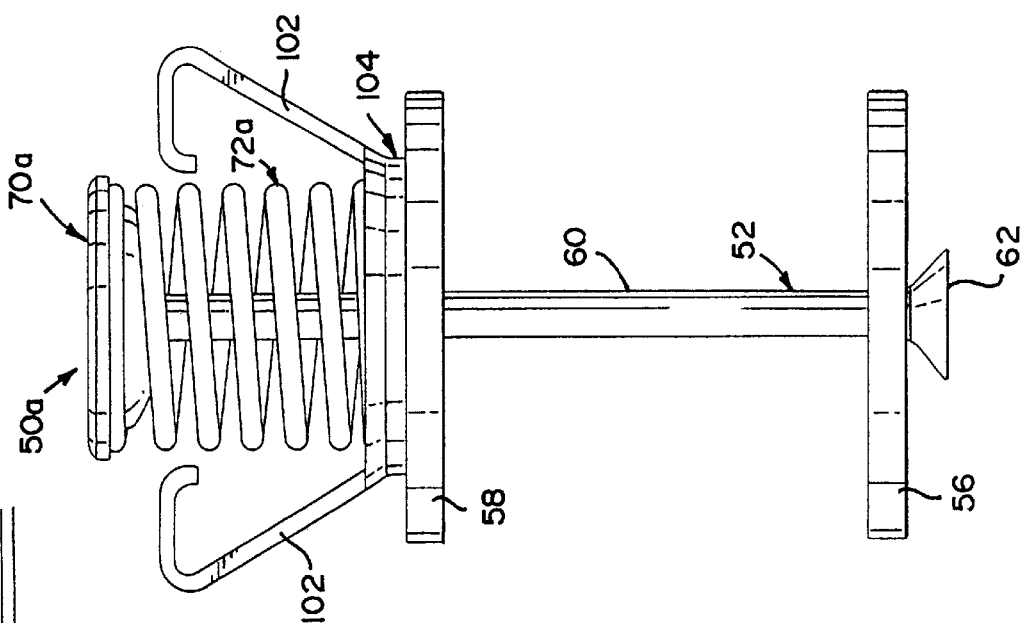
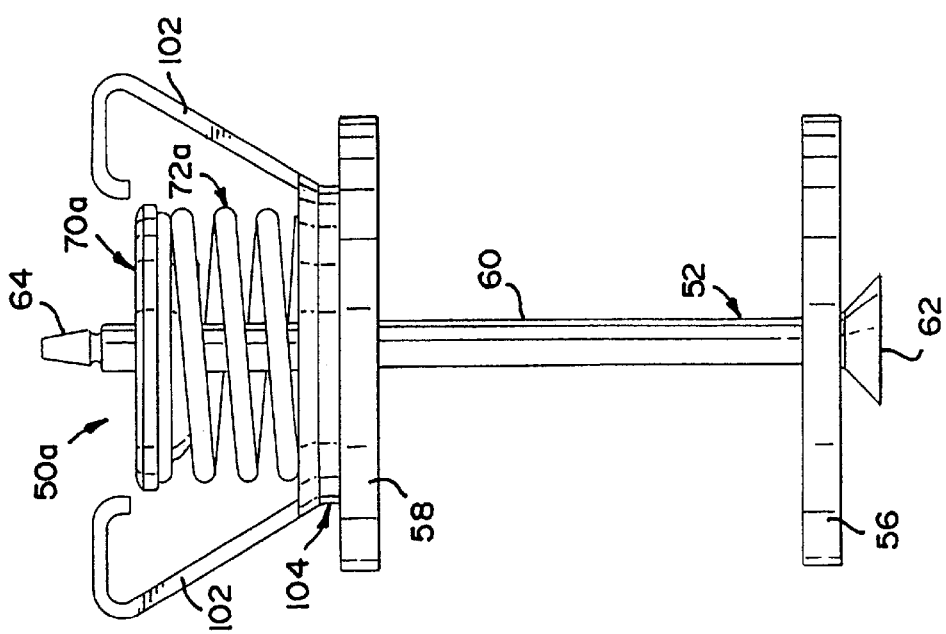

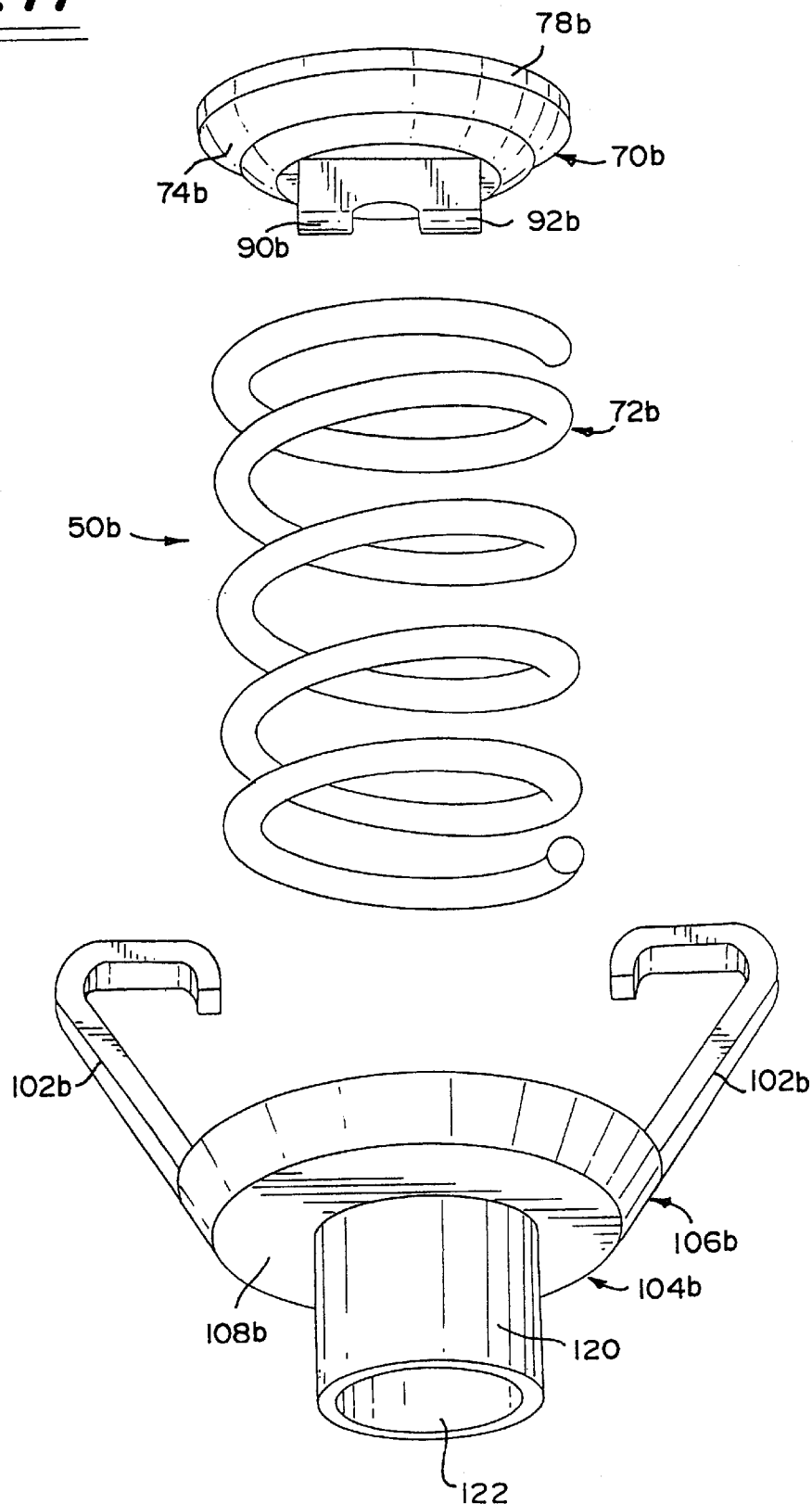

ND PREASSEMBLED
BRAKE SHOE PIN AND PREASSEMBLED SPRING AND CUP ASSEMBLY

BACKGROUND OF THE INVENTION

This invention is generally directed to a novel preassembled spring and cup assembly for use in a brake assembly of a vehicle, such as an automobile, truck or the like.

With reference to FIG. 1, there is shown a typical drum brake type assembly. These prior art brake assemblies include a drum brake assembly 20 which is generally formed from a brake drum (not shown) and an inner shoe assembly 22, which includes a pair of brake shoes 24, 26 mounted to a brake shoe mounting plate. The brake drum shoe assembly 22 is connected to the wheel axle of the vehicle, a standard brake drum carried by the associated wheel surrounds the brake drum shoe assembly 22. A brake lining 28 is attached to each brake shoe 24, 26 between the respective brake shoe 24, 26 and the brake drum. The pair of brake shoes 24, 26 are pivoted on one end at pivots 30 and driven by a piston member 32 at the opposite end.

To activate the brakes of the vehicle, the driver depresses the brake pedal which causes the piston member 32 in the drum brake assembly 20 to operate. When this occurs, the arms of the piston member 32 extend, which, in turn, causes the brake shoes 24, 26 to move outwardly against the brake drum. The brake linings 28 rub against or engage the brake drum causing a braking motion in that the rotation of the wheel decreases, thereby slowing the speed of the vehicle. Once the driver takes his or her foot off of the brake pedal, this causes the arms on the piston member 32 to retract, which, in turn, causes the brake shoes 24, 26 to move inwardly away from the brake drum so as not to interfere with the rotation of the brake drum and wheel.

A problem that occurs with this type of drum brake assembly 20 is that the brake shoes 24, 26 tend to freely move which can cause undesired engagement of the brake shoes 24, 26 with the brake drum. Commonly, a brake shoe nail or pin 34 in combination with a brake shoe retention spring and retainer cup assembly 36, formed from a retention spring 38 and a retainer cup 40, is used to prevent or at least minimize the amount of float by the piston member 32 and to maintain axial alignment of the brake shoes 24, 26 with the brake shoe mounting plate so as to prevent undesired engagement of the brake shoes 24, 26 with the brake drum. The brake shoe retention spring 38 holds the brake shoes 24, 26 against the brake shoe mounting plate so the brake shoes 24, 26 do not move over and rub against the face of the brake drum. The retention spring 38 is designed so that it can move with the brake shoes 24, 26 as the brakes of the vehicle are engaged and disengaged. A brake shoe pin 34 and spring and cup assembly 36 are positioned intermediate the ends of each brake shoe 24, 26.

To assemble a prior art pin 34 and a spring and cup assembly 36 with the brake drum shoe assembly 22, a person who is installing the assembly 36 places the retention spring 38 against the brake shoe, e.g. 24. Thereafter, the installer engages the retainer cup 40 against the retention spring 38. Next, the installer passes the brake shoe pin 34 through respective bores in the brake shoe mounting plate and the brake shoe 24.

To assemble the brake shoe pin 34 with the retainer cup 40, the installer must use a special hand tool to create an end load of approximately 18–50 pounds of force to push the retainer cup 40 toward the brake shoe 24, thereby compressing and preloading the retention spring 38. After the brake shoe pin 34 has passed through an opening in the retainer cup 40, the installer must then twist the retainer cup 40 in order to bring the pin 34 into the proper engagement with the retainer cup 40 to lock the brake shoe pin 34 with the cup 40. Thereafter, the hand tool is disengaged from the cup 40 which allows the retention spring 38 to expand.

The above-described method is tiresome as it requires not only the application of considerable end loading but also a twisting motion while the end load is being applied. In addition, this method is slow and is ergonomically very difficult on the installer. Furthermore, a special tool is required to assemble the components, which increases the cost of the assembly.

Therefore, a need exists for an easier method of loading the retention spring and assembling the brake shoe pin and the spring and retainer cup assembly with the drum brake assembly. The present invention provides a novel preassembled and preloaded spring and retainer cup assembly with which a brake shoe pin can be easily engaged for use in preventing or at least minimizing the amount of float by the piston member and maintaining axial alignment of the brake shoes with the brake shoe mounting plate. The brake shoe retention spring holds the brake shoes against the brake shoe mounting plate so the brake shoes do not move over and rub against the face of the brake drum. The preloaded assembly and method of the present invention eliminates the need for the application of an end load with twisting motion which is required to effect mounting of the pin, spring and cup assembly in prior art assemblies. The present invention also provides a novel and easy method of installing the preassembled and preloaded retention spring and retainer cup assembly with the brake drum shoe assembly. Other features and advantages will become apparent upon a reading of the attached specification.

OBJECTS AND SUMMARY OF THE INVENTION

A general object of the present invention is to provide a novel preassembled and preloaded brake shoe retention spring and retainer cup assembly with which a brake shoe pin can be easily engaged for use in maintaining axial alignment of the brake shoes with a brake shoe mounting plate in a brake assembly.

Another general object of the present invention is to provide a novel and easy method of installing the preassembled and preloaded brake shoe retention spring and retainer cup assembly with the brake drum shoe assembly.

Another object of the present invention is to provide a method of easily releasing the preloading of the retention spring by use of the brake shoe pin.

A further object of the present invention is to provide a method of easily releasing the preloading of the retention spring without the use of a special hand tool.

Yet a further object of the present invention is to provide a method of easily installing the retention spring without the requirement of a twisting motion as is necessary in prior art assembly methods.

Briefly, and in accordance with the foregoing, the present invention discloses a novel preassembled spring and cup assembly for use with a brake assembly for a vehicle, such as an automobile, truck or the like.

The brake assembly includes a brake shoe and a brake shoe mounting plate to which the brake shoe is mounted. The brake shoe has a bore therethrough and the brake shoe mounting plate has a bore therethrough.

The spring and cup assembly includes a cup which is secured with a spring. The cup has a T-shaped slot therethrough through which a convention brake shoe pin is passed to retain the pin with the cup and to retain the preassembled and preloaded spring and cup assembly with the brake assembly. The cup further preferably includes at least one indent in which the pin is releasably retained.

The assembly further includes structure for retaining the spring in an initial or precompressed condition. The retaining structure is capable of being selectively released to allow the spring to expand after the pin is positioned relative to the cup.

In a first embodiment, the retaining structure is an arm portion or extension which is integrally formed with the spring and extends upwardly to the cup to engage the cup through an opening in the cup to maintain the initial, precompressed condition for the spring. The brake shoe pin is used to release the retaining structure, thus permitting the spring to partially expand.

In a second embodiment, a base stamping is provided which is affixed proximate to the bottom or second end of the spring. Arm portions extend upwardly from a base portion of the base stamping to engage the cup. The arm portion are initially formed to diverge away from their assembled position and are resiliently deformed and bent into the engaged position wherein the upper, reverse bent portion of the arms can embrace the cup member which overlies the spring, then maintain the precompressed condition for the spring. Upon final assembly, the cup is pressed in a direction in opposition to the spring force to compress the spring, moving the cup out of engagement with the ends of the arms portions so as to allow the arm portions to spring or move away from their engagement with the cup.

In the third embodiment of the preassembled spring and cup assembly, the base stamping has been modified to include a pilot which extends from the base portion. The pilot seats within the bore through the brake shoe to connect the preassembled spring and cup assembly to the brake assembly and to provide a pivot surface for linkages used within the brake assembly.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 8 is a side elevational view showing the brake shoe pin passed through the brake drum shoe assembly and through the second embodiment of the preloaded retention spring and retainer cup assembly at the verge of the preloaded retention spring and retainer cup being unloaded;

FIG. 9 is a side elevational view showing the brake shoe pin, the brake drum shoe assembly and the second embodiment of the retention spring and retainer cup assembly in its final assembly;

FIG. 11 is an exploded, perspective view of a third embodiment of the retention spring and retainer cup assembly.

DETAILED DESCRIPTION OF THE PREFERRED EMBODIMENT

Figure 1:
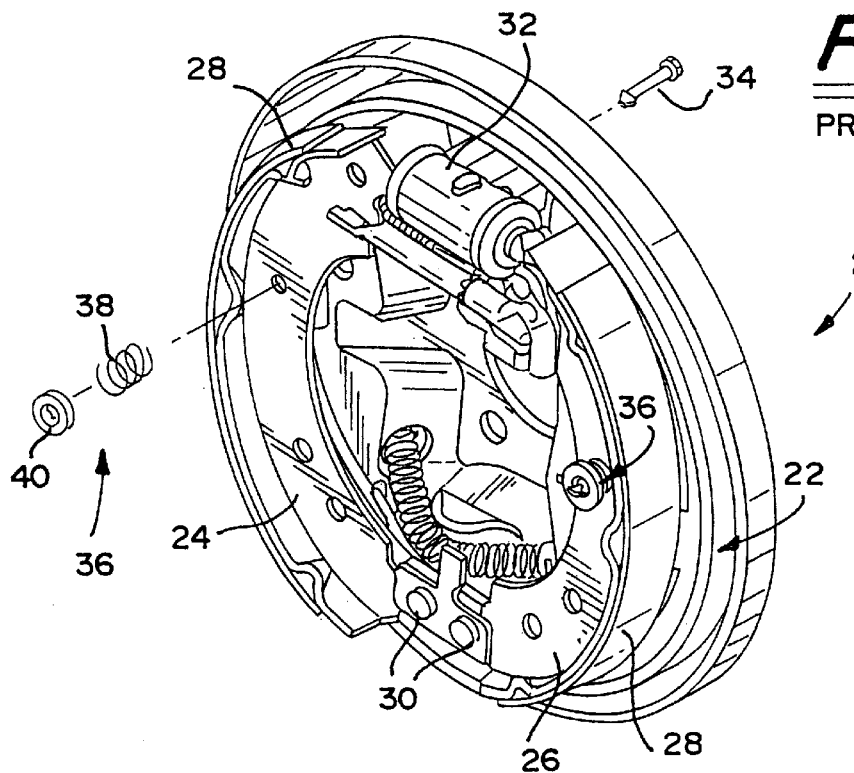
FIG. 1 is a perspective view of a brake drum shoe assembly which has a prior art brake shoe pin, brake shoe retention spring and retainer cup assembly attached thereto at one location and at another location, a prior art brake shoe pin, retention spring and retainer cup assembly are shown exploded or in the process of being attached thereto.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The present invention presents a novel preassembled and preloaded brake shoe retention spring and retainer cup assembly 50 which is used with a brake shoe nail or pin 52 for maintaining the axial alignment of brake shoes with a brake shoe mounting plate in a brake drum shoe assembly 54. The novel spring and cup assembly 50 of the present invention generally includes a retainer cup 70 and a retention spring 72 which is preassembled with the retainer cup 70 and is held in a precompressed state to preload the retention spring 72. The retention spring 72 holds the brake shoes against the brake shoe mounting plate so the brake shoes do not move over and rub against the face of the brake drum.

A first embodiment of the spring and cup assembly 50 of the present invention is shown in FIGS. 2–5. In the first embodiment of the preloaded spring and cup assembly 50, the assembly 50 is actuated by use of a brake shoe nail or pin 52 that will release the preloaded retention spring 72 upon initial assembly as described further herein. The assembly 50 further includes structure for retaining the spring 72 in the initial or precompressed condition which is integrally formed with the spring 72 which is described in detail herein. The retaining structure is capable of being selectively released to allow the spring 72 to expand after the pin 52 is positioned relative to the cup 70.

A second embodiment of the spring and cup assembly 50a of the present invention is shown in FIGS. 6–10. In the second embodiment, an additional member is used to hold the spring 72 in a preassembled and precompressed state as described herein.

In the third embodiment of the preassembled spring and cup assembly 50b, the additional member has been modified to include a pilot which is described further herein and which extends therefrom.

Like elements in each embodiment are denoted by like reference numerals, with the reference numerals in the second embodiment being denoted with the suffix "a" after the numeral and the reference numerals in the third embodiment being denoted with the suffix "b" after the numeral.

In describing the embodiments of the present invention, terms, such as "upwardly", "downwardly", "upper", "bottom" or the like, are used. It is to be understood that the use of this terminology does not denote a specific orientation and are only used for ease in explanation of the invention.

The specifics of brake drum shoe assemblies 54 are well-known in the art, and therefore, are not described herein. For purposes of discussion of the specifics of the present invention, it is set forth, as is generally known, that the brake drum shoe assembly 54 with which the present invention is employed, includes, among other components, a brake shoe mounting plate 56 and a pair of brake shoes 58 (only one of which is shown and discussed herein). The brake shoe mounting plate 56 and the brake shoe 58 each have a bore therethrough, which bores are aligned with each other. Each brake shoe 58 is retained against the brake shoe mounting plate 56 by individual brake pins 52 and preassembled and preloaded brake shoe retention spring and retainer cup assemblies 50 formed in accordance with the present invention.

The brake nail or pin 52 that is used with the present invention is of a standard structure. The brake pin 52 has an elongated shank 60 having a head 62 at a first end. The second end of the elongated shank 60 has a cross-head 64 thereon which is separated by the remainder of the shank 60 by a necked-down portion 66. The portion of the cross-head 64 which is proximate to the necked-down portion 66 provides shoulders 68. Alternatively, an enlarged head may be provided at the end of the elongated shank 60 without the provision of the necked-down portion 66. The brake shoe pin 52 is made of suitable materials, preferably corrosion resistance metal.

Attention is now directed to the specifics of the first embodiment of the preassembled and preloaded or precompressed retention spring and cup assembly 50 of the present invention. The first embodiment of the preloaded spring and cup assembly 50 is actuated by use of the brake shoe pin 52 that will release the preloaded retention spring 72 upon initial assembly.

The retainer cup 70 includes a generally cylindrical side wall 74 which has a bottom wall 76 at its bottom end. A rim or flange 78 protrudes outwardly from the top end of the side wall 74. The retainer cup 70 is formed from a suitable material, preferably corrosion resistance metal. The side wall 74 of the retainer cup 70 can be constructed to be tapered.

Figure 2B:
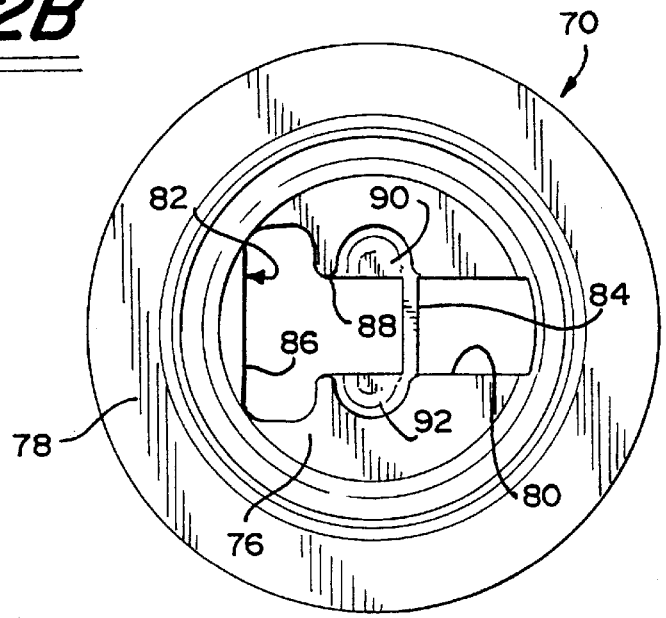
FIG. 2B is a top plan view of the retainer cup which is a component of the preloaded retention spring and retainer cup assembly, shown without the spring attached thereto.

The bottom wall 76 of the retainer cup 70 includes an opening 80 and a slot 82 therethrough separated from each other by a narrow bridge 84, FIG. 2B. The opening 80 is of a predetermined size as described hereinafter. The slot 82 is T-shaped and has a first leg 86 and a second leg 88 which is perpendicular to the first leg 86.

The first leg 86 of the T-shaped slot 82 has a length and a width which are slightly greater than the length and width of the cross-head 64 of the pin 52. The second leg 88 of the T-shaped slot 82 has a length and a width which is approximately the same size as the necked-down portion 66 of the brake shoe pin 52 and is provided through the center of the bottom wall 76 of the retainer cup 70. If the necked-down portion 66 of the pin 52 is not provided and instead an enlarged head is provided on the end of the elongated shank 60, the second leg 88 of the T-shaped slot 82 has a length and a width which is approximately the same size as the shank 60 of the brake shoe pin 52.

An indent 90, 92 is preferably provided proximate to both sides of the second leg 88 of the T-shaped slot 82. The indents 90, 92 extend downwardly from the upper surface of the bottom wall 76 of the retainer cup 70 and provides a bearing surface upon which the shoulders 68 of the cross-head 64 rest when the pin 52 is assembled with the preassembled and preloaded or precompressed spring and cup assembly 50 as described hereinbelow. Each indent 90, 92 has a width which is slightly greater than the width of the cross-head 64. From the outer end of one indent 90, across the second leg 88 of the T-shaped slot 82, to the outer end of the other indent 92, the combined length is slightly greater than the length of the pin cross-head 64.

The retention spring 72 is formed from multiple helical coils which define coil portion 94 and includes an extension or arm portion 96 disposed inward of the coils 94, and discussed in greater detail hereafter. The coil portion 94 has first and second ends and a predetermined spring force. A portion of the coil portion 94, starting with the first end, surrounds and is tightly engaged with the side wall 74 of the retainer cup 70 such that the retainer cup 70 and the retention spring 72 cannot be easily separated.

The extension or arm portion 96 is integrally formed with the second end of the coil portion 94 and extends upwardly and internally of the coil portion 94 toward the retainer cup 70. The arm portion 96 includes a first section 97 which extends inwardly towards the center of the coil portion 94 and is generally parallel to the bottom wall 76 of the retainer cup 70, a second section 98 which extends upwardly towards the retainer cup 70, and a third section 100 which is generally parallel to the bottom wall 76 of the retainer cup 70. The second section 98 of the arm portion 96 has a length which is shorter than the length of the retention spring 72 when it is in a fully expanded state. As shown, the arm portion 96 extends upwardly toward the retainer cup 70 inwardly of the coil portion 94. It is to be understood that the arm portion 96 could instead extend upwardly toward the retainer cup 70 outside of the coil portion 94.

The opening 80 in the retainer cup 70 has a length and a width which is slightly greater than the length and width of the third section 100 of the arm portion 96. This allows the third section 100 of the arm portion 96 to be inserted through the opening 80 so that the third section 100 can overlay and engage the bridge 84 in the bottom wall 76 of the retainer cup 70 as described hereinbelow.

Prior to assembly of the spring and cup assembly 50 with the brake drum shoe assembly 54, the retention spring 72 and retainer cup 70 are preassembled together. When preassembled, the retention spring 72 is compressed and the third section 100 of the arm portion 96 is engaged with the bridge 84 such that the third section 100 completely overlays the bridge 84 and partially extends over the second leg 88 of the T-shaped slot 82. This places the retention spring 72 in a preloaded state.

Figure 2:
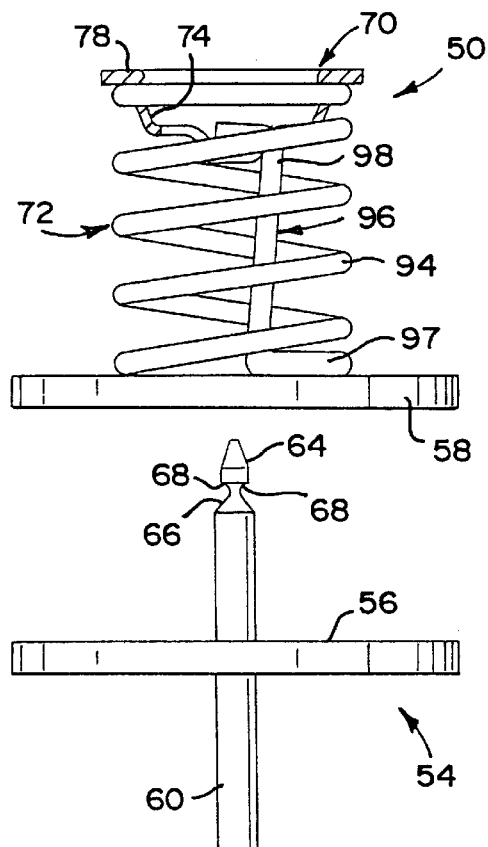
FIG. 2 is a side elevational view of a brake drum shoe assembly which includes a brake shoe mounting plate and a brake shoe; a brake shoe pin engaged through the mounting plate; and a preloaded retention spring and retainer cup assembly which incorporates the features of a first embodiment of the invention engaged against the brake shoe.
Figure 2A:
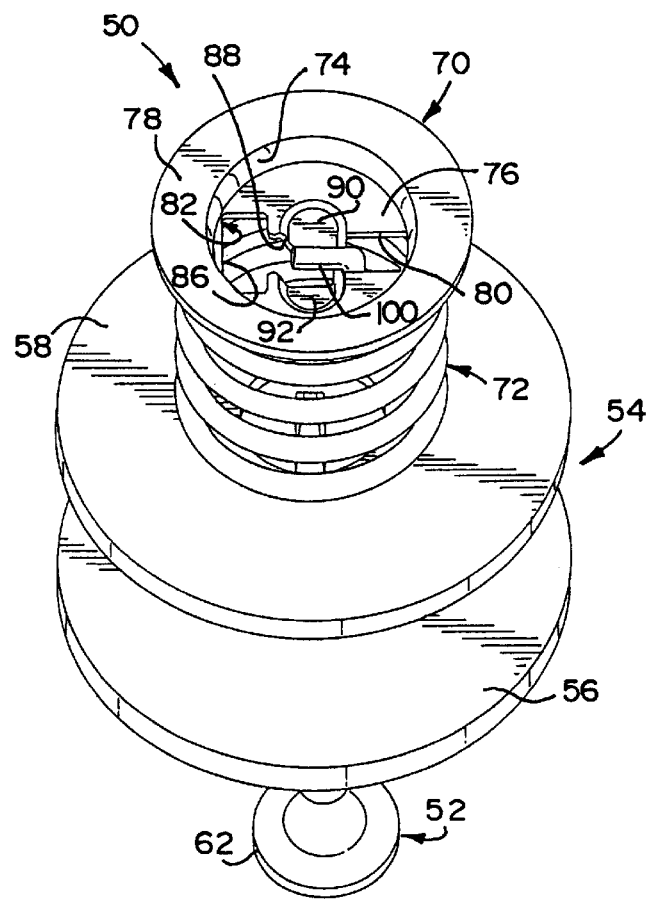
FIG. 2A is a top perspective view of the brake drum shoe assembly, brake pin and the first embodiment of the preloaded retention spring and retainer cup assembly as shown in FIG. 2.

Thereafter, as shown in FIGS. 2 and 2A, the preassembled and preloaded spring and cup assembly 50 is placed against the brake shoe 58. The coiled portion 94 of the retention spring 72 surrounds the bore in the brake shoe 58 and the second leg 88 of the T-shaped slot 82 is aligned with the aligned bores in the brake shoe 58 and brake shoe mounting plate 56. The brake shoe pin 52 is passed through the aligned bores in the brake shoe mounting plate 56 and the brake shoe 58 until the head 62 of the pin 52 contacts the underside of the brake shoe mounting plate 56. The bore in the brake shoe mounting plate 56 is smaller than the head 62 of the pin 52 to prevent the head 62 of the pin 52 from passing therethrough.

Figure 3:
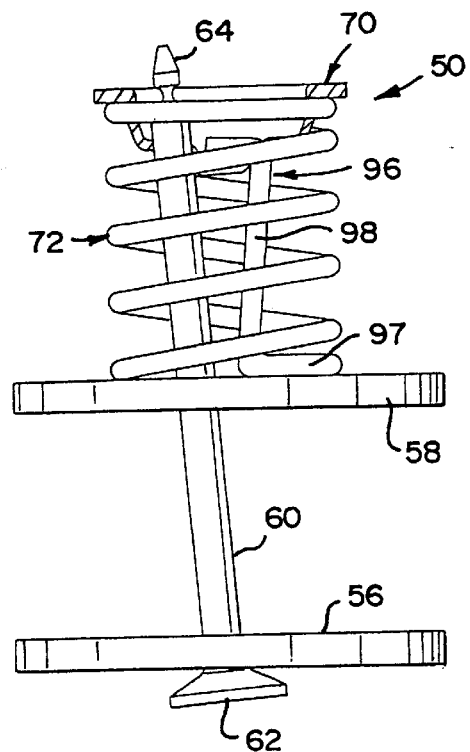
FIG. 3 is a side elevational view showing the brake shoe pin passed through the brake drum shoe assembly and through the first embodiment of the preloaded retention spring and retainer cup assembly.
Figure 3A:
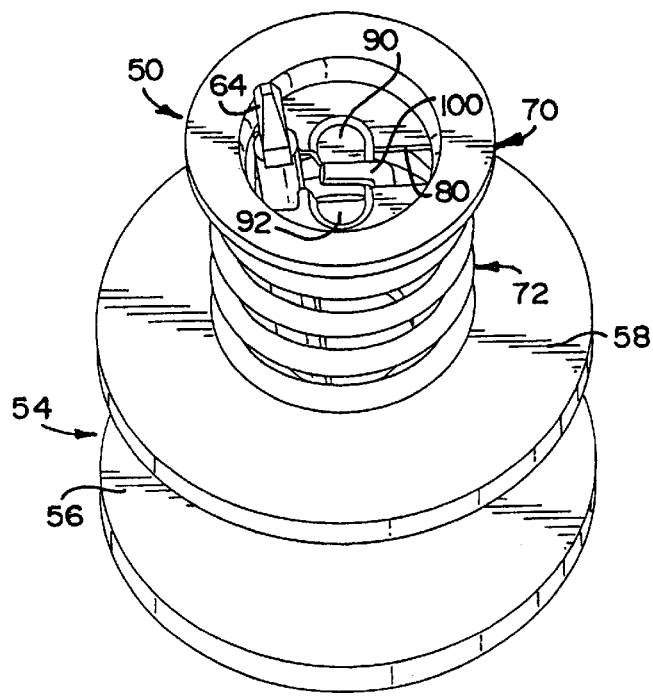
FIG. 3A is a top perspective view of the brake drum shoe assembly, brake pin and the first embodiment of the preloaded retention spring and retainer cup assembly as shown in FIG. 3.

After the pin 52 passes through the brake shoe 58, the pin 52 is passed upwardly through the middle of the coiled portion 94 of the retention spring 72. Thereafter, as shown in FIGS. 3 and 3A, the cross-head 64 of the brake pin 52 is inserted through the first leg 86 of the T-shaped slot 82 in the retainer cup 70 until the cross-head 64 of the pin 52 is positioned upwardly of the bottom wall 76 of the retainer cup 70.

Figure 4:
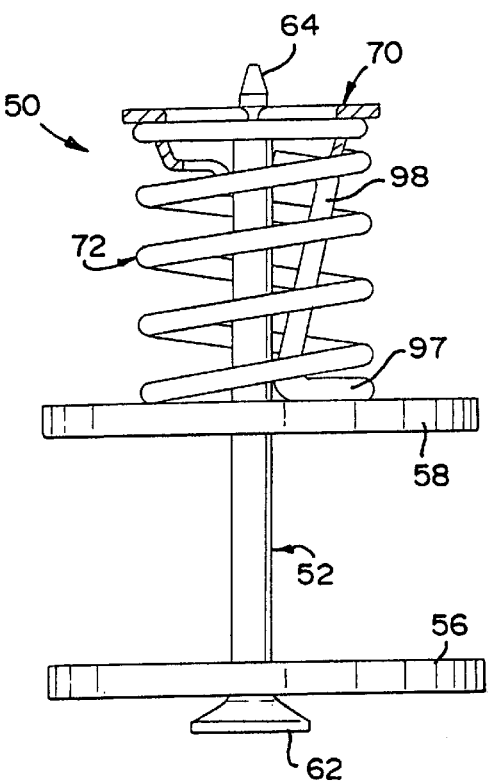
FIG. 4 is a side elevational view showing the brake shoe pin passed through the end brake drum shoe assembly and the first embodiment of the preloaded retention spring and retainer cup assembly at the verge of the preloaded retention spring and retainer cup assembly being unloaded.
Figure 4A:
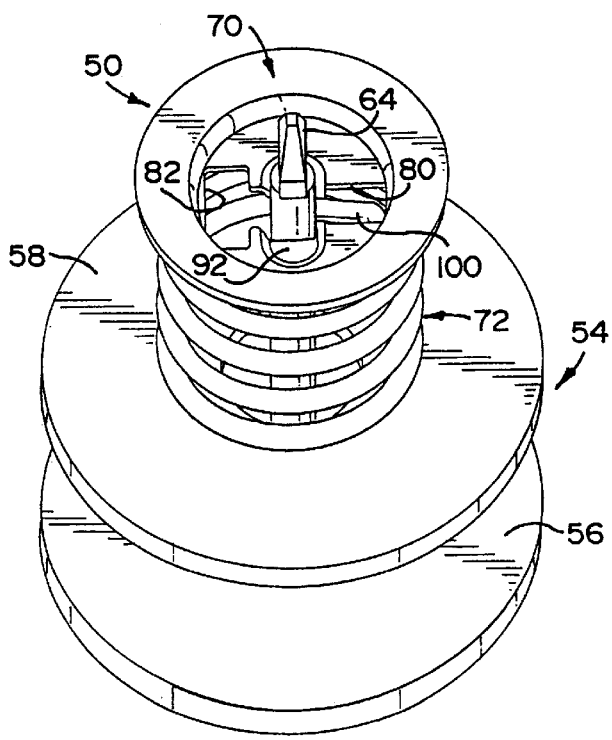
FIG. 4A is a top perspective view of the brake drum shoe assembly, brake pin and the first embodiment of the preloaded retention spring and retainer cup assembly as shown in FIG. 4.
Figure 5:
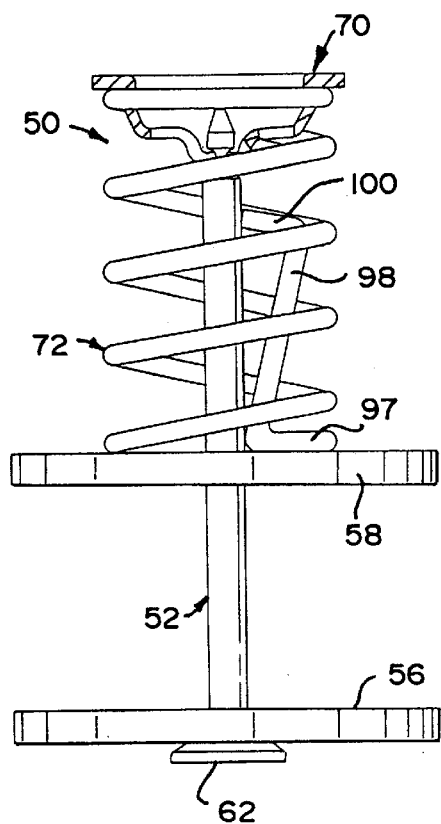
FIG. 5 is a side elevational view showing the brake shoe pin, the brake drum shoe assembly and the first embodiment of the retention spring and retainer cup assembly in its final assembly.
Figure 5A:
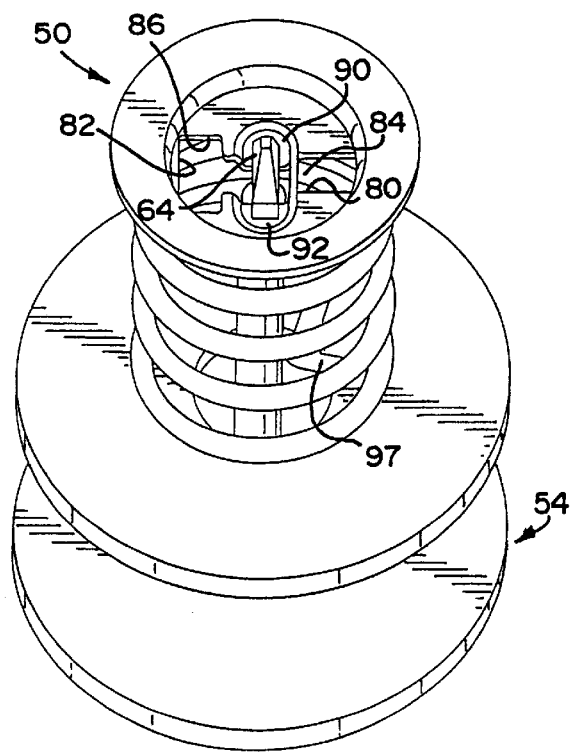
FIG. 5A is a top perspective view of the brake drum shoe assembly, the brake shoe pin and the first embodiment of the preloaded retention spring and retainer cup assembly as shown in FIG. 5.

As shown in FIGS. 4 and 4A, the brake pin 52 is then moved laterally so that the necked-down portion 66 of the brake pin 52 (or the shank if a necked-down portion is not provided) travels into the second leg 88 of the T-shaped slot 82. When the pin 52 enters into the second leg 88 of the slot 82, the pin 52 contacts the end of the third section 100 of the spring arm portion 96 which overhangs the second leg 88 of the slot 82 and disengages the third section 100 from its contact with the bridge 84 and pushes it backwardly through the opening 80. Because the retention spring 72 was being held in its compressed state by the arm portion 96, once the third section 100 of the arm portion 96 is released from its engagement with the bridge 84, the retention spring 72 expands partially toward its fully expanded position, with the pin 52 and cross-head 64 maintaining an intermediate degree of compression as required to maintain sufficient force on the brake shoe 58 to assure its axial alignment, FIGS. 5 and 5A. As the retention spring 72 expands, the cross-head 64 of the brake pin 52 is moved downwardly toward the bottom wall 76 of the retainer cup 70 and is captured and rests in the indents 90, 92 proximate to the second leg 88 of the T-shaped slot 82 to lock the brake pin 52 to the retainer cup 70. The retention spring 72 provides sufficient force to maintain the brake shoe 52 in proper alignment.

When the brake pin 52 is moved so as to disengage the third section 100 from its contact with the bridge 84, the installer may want to control the rate of extension of the retention spring 72 so as to prevent the uncontrolled movement of the head 62 of the pin 52 towards the brake shoe mounting plate 56. This minimizes the possibility of harm to the installer's fingers if the installer is holding the pin 52 by the head 62 during this process.

To remove the spring and cup assembly 50 and the brake pin 52 from the brake drum shoe assembly 54, the retainer cup 70 is pushed downwardly toward the brake shoe 58 to compress the retention spring 72. As the retainer cup 70 is pushed downwardly, the cross-head 64 of the brake pin 52 is moved upwardly of the indents 90, 92 and into the second leg 88 of the T-shaped slot 82. The cup 70 is moved slightly laterally to cause the necked-down portion 66 (or shank if a necked-down portion is not provided) to move into the first leg 86 of the T-shaped slot 82 to release the brake pin 52 from the slot 82. Thereafter, the brake pin 52 is removed from the brake drum shoe assembly 54. During this removal process, the retention spring 72 remains essentially unloaded.

Attention is now directed to the specifics of the second embodiment of the preassembled and preloaded or precompressed spring and cup assembly 50a shown in FIGS. 6–10. In the second embodiment of the spring and retainer cup assembly 50a, the arm portion 96 of the retention spring 72 and the opening 80 in the bottom wall 76 of the retainer cup 70 in the first embodiment of the spring and cup assembly 50 have been eliminated. Instead, the retention spring 72a is held in a compressed state by a base stamping 104 in which the retention spring 72a is seated.

The elements of the retainer cup 70a are identical to that of the first embodiment, with the exception that the opening 80 has been eliminated. Therefore, the specifics of the retainer cup 70a are not repeated herein, but the elements of the retainer cup 70a that are identical to those shown in the first embodiment are described herein and are identified in the drawings with like reference numerals having the suffix "a" thereafter.

Similarly, the elements of the retention spring 72a are identical to that of the first embodiment, with the exception that the arm portion 96 has been eliminated. Therefore, the specifics of the retention spring 72a are not repeated herein, but the elements of the retention spring 72a that are identical to those shown in the first embodiment are described herein and are identified in the drawings with like reference numerals having the suffix "a" thereafter. Like that of the first embodiment, the side wall 74a of the retainer cup 70a can be constructed to be tapered.

The base stamping 104 is formed from a base portion 106 and a pair of arm portions 102. The base portion 106 includes a bottom wall 108 against which the first end of the retention spring 72a seats and a side wall 110 which extends upwardly from the bottom wall 108. In the middle of the bottom wall 108 of the base portion 106, an opening 112 is provided therethrough. The base stamping 104 is made of a suitable material, preferably corrosion resistant metal.

Figure 10:
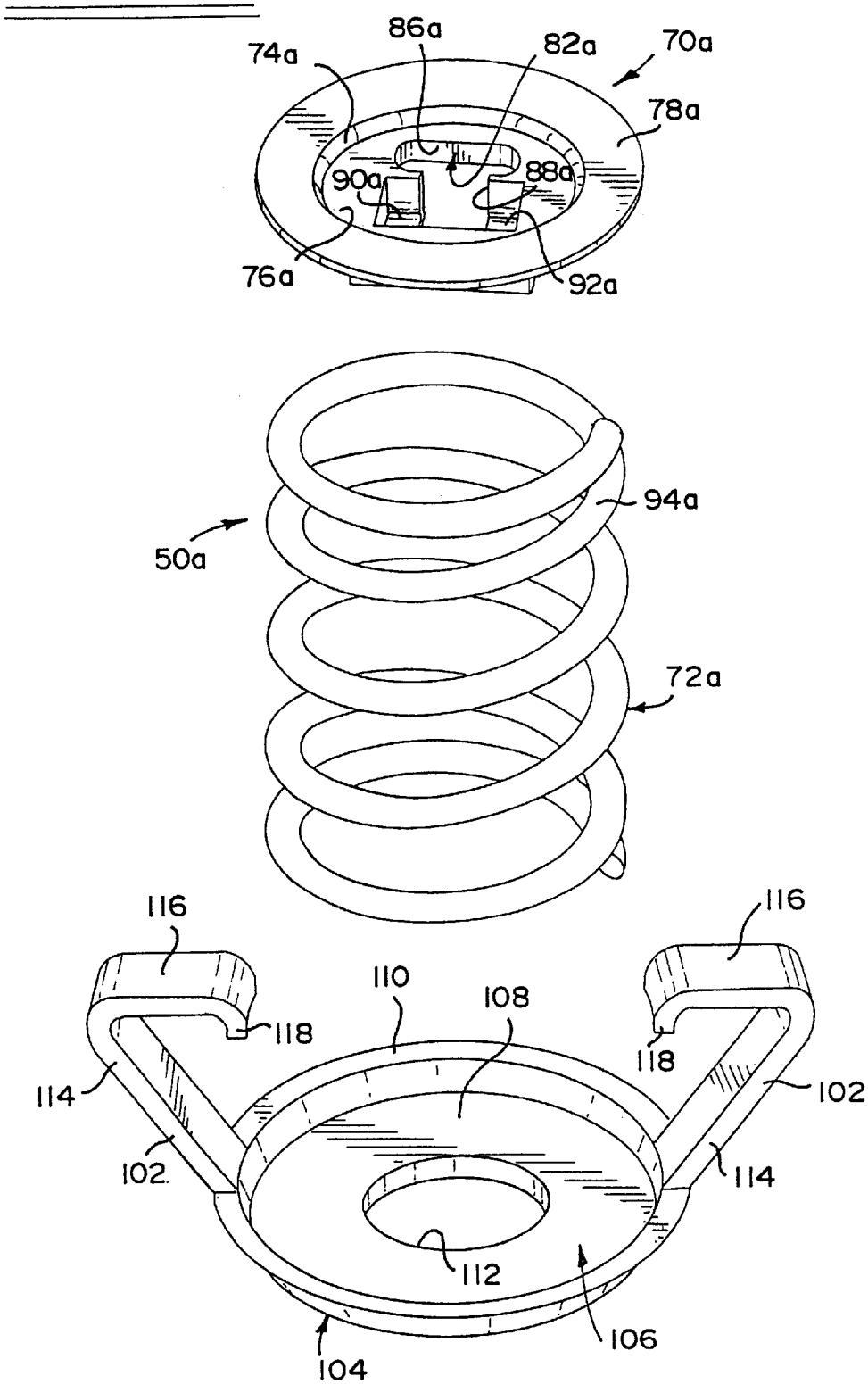
FIG. 10 is an exploded, perspective view of the second embodiment of the retention spring and retainer cup assembly.

As shown in FIG. 10, the base stamping 104 is initially formed with the arm portions 102 diverging upwardly and outwardly. The arm portions 102 are resilient or spring-like and are resiliently deformed or bent into the positions shown in FIGS. 6–9 to engage the retainer cup 70a and spring member 72a. Each arm portion 102 includes a first segment 114, a second segment 116 and a third segment 118. The segments 114, 116, 118 are integrally formed with each other and with the base portion 106 of the base stamping 104.

Each first segment 114 of the arm portions 102 is angled outwardly from the base portion 106 of the base stamping 104 and is formed from a resilient material. The length of each first segment 114 is less than the length of the retention spring 72a in its expanded condition.

Each second segment 116 is angled relative to the respective first segment 114 and is generally parallel to the rim 78a of the retainer cup 70a. The length of each second segment 116 is approximately equal to the length of the rim 78a of the retainer cup 70a.

Each third segment 118 is generally perpendicular to the respective second segment 116 to provide a reverse-bent configuration. The length of each third segment 118 is approximately equal to the height of the side wall 74a of the retainer cup 70a.

Figure 6:
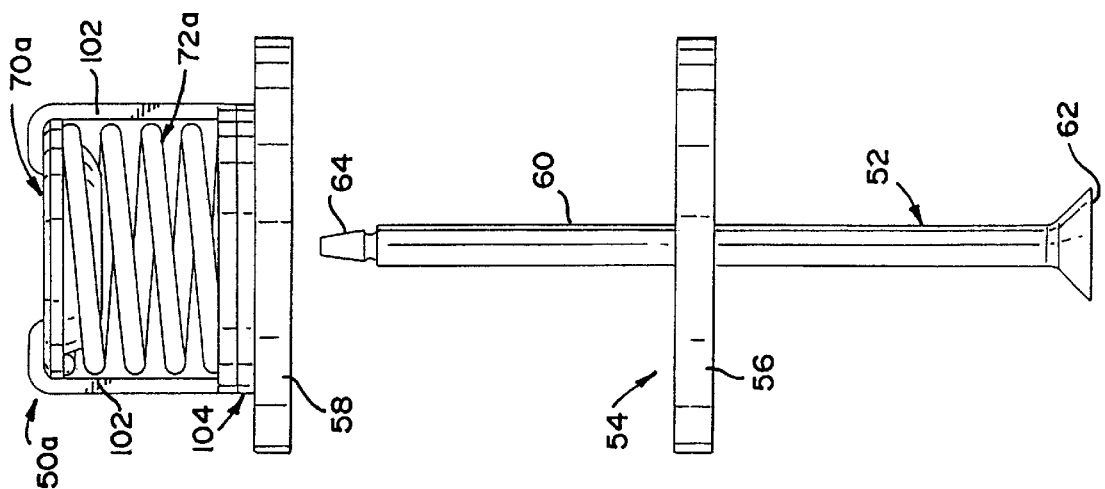
FIG. 6 is a side elevational view of a brake drum shoe assembly which includes a brake shoe mounting plate and a brake shoe; a brake shoe pin engaged through the brake shoe mounting plate; and a preloaded retention spring and retainer cup assembly which incorporates the features of a second embodiment of the invention engaged against the brake shoe.

To load the spring and cup assembly 50a, the retention spring 72a, which has the retainer cup 70a attached thereto at its first end as described hereinabove, is seated in the base portion 106 of the base stamping 104. Thereafter, the retainer cup 70a is pushed down to compress the retention spring 72a. This may be effected by hand or by the use of a tool. The retention spring 72a is compressed to a point where the third segment 118 of the stamping arm portions 102 is above the rim 78a of the retainer cup 70a. Thereafter, the arm portions 102 are deformed or bent inwardly toward the retainer cup 70a until the second and third segments 116, 118 of the arm portions 102 grasp the rim 78a and side wall 74a of the retainer cup 70a. The spring 72a is then released, with the engagement of arm portions 102 with cup 70a holding the base stamping 104 and the spring and cup assembly 50a together and preloads the retention spring 72a into a compressed condition as shown in FIG. 6.

To release the spring and cup assembly 50a during installation with the brake drum shoe assembly 54, the base stamping 104 is seated against the brake shoe 58 to which the assembly 50a is to be attached. The opening 112 in the bottom wall 108 of the base stamping 104 is aligned with the bore through the brake shoe 58.

Next, the brake shoe pin 52 is inserted through the aligned bores in the brake shoe mounting plate 56 and brake shoe 58. As the pin 52 exits the bore through the brake shoe 58, the pin 52 passes through the opening 112 in the bottom wall 108 of the base portion 106 and then is passed upwardly through the middle of the coiled portion 94a of the retention spring 72a.

Figure 7:
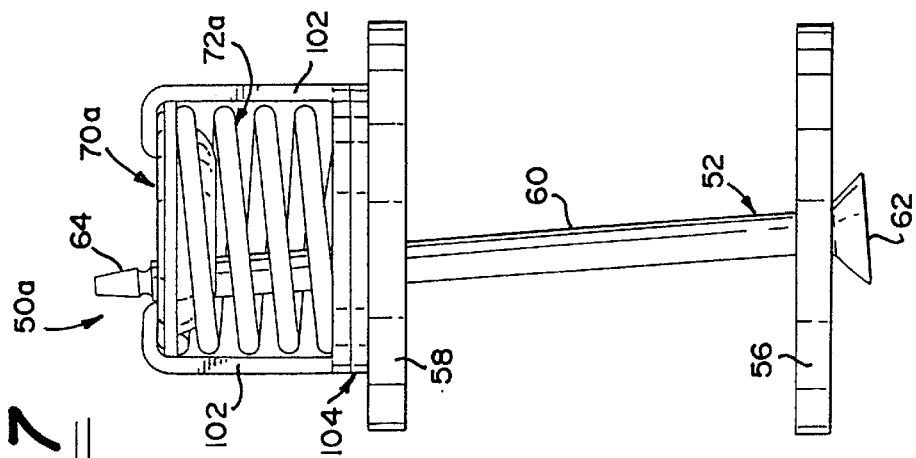
FIG. 7 is a side elevational view showing the brake shoe pin passed through the brake drum shoe assembly and through the second embodiment of the preloaded retention spring and retainer cup assembly.

Thereafter, as shown in FIG. 7, the cross-head 64 of the brake pin 52 is inserted through the first leg 86a of the T-shaped slot 82a in the retainer cup 70a until the cross-head 64 of the pin 52 is positioned upwardly of the bottom wall 76a of the retainer cup 70a. The brake pin 52 is then moved laterally so that the necked-down portion of the brake pin 52 (or the shank if a necked-down portion is not provided) moves into the second leg 88a of the slot 82a until the pin 52 contacts the end of the second leg 88a of the slot 82a.

Next, as shown in FIG. 8, the retainer cup 70a is pushed slightly downwardly toward the brake shoe 58 to slightly compress the retention spring 72a. The retainer cup 70a is pushed downwardly a distance which is greater than the length of each third segment 118 of each arm portion 96 so that the second and third segments 116, 118 of the respective arm portions 96 disengage from contact with the side wall 74a and rim 78a of the retainer cup 70a. Because the first segments 114 of the arm portions 102 are resilient and are normally biased outwardly relative to the base portion 106 of the base stamping 104, the arm portions 102 spring outwardly away from the spring and cup assembly 50a.

Because the retention spring 72a was being held in its compressed state by the arm portions 102, once the arm portions 102 are released from their engagement with the retainer cup 70a, the retention spring 72a expands towards its fully expanded state as shown in FIG. 9. As the retention spring 72a expands, the cross-head 64 of the brake pin 52 is moved downwardly toward the bottom wall 76a of the retainer cup 70a and is captured and rests in the indents 90a, 92a proximate to the second leg 88a of the slot 82a to lock the brake pin 52 to the retainer cup 70a. The retention spring 72a, which is in an intermediate compressed condition as discussed with respect to the first embodiment, provides sufficient force to maintain the brake shoe 58 in proper alignment.

To remove the spring and cup assembly 50a and the brake pin 52 from the brake drum shoe assembly 54, the retainer cup 70a is pushed downwardly toward the brake shoe 58 to compress the retention spring 70a. As the retainer cup 70a is pushed downwardly, the cross-head 64 of the brake pin 52 is moved upwardly of the indents 90a, 92a and into the second 88a leg of the T-shaped slot 82a. The cup 70a is moved slightly laterally to cause the necked-down portion (or shank if a necked-down portion is not provided) to move into the first leg 86a of the T-shaped slot 82a to release the brake pin 52 from the slot 82a. Thereafter, the brake pin 52 is removed from the brake drum shoe assembly 54. During this removal process, the retention spring 72a remains essentially unloaded.

The spring and retainer cup assembly 50a can be easily preloaded again by using the method described hereinabove.

Attention is finally directed to FIG. 11, which shows the third embodiment of the spring and retainer cup assembly 50b of the present invention. The third embodiment is substantially identical to the second embodiment shown in FIGS. 6–10. Therefore, only the differences between the embodiments will be noted.

In the third embodiment of the assembly 50b, the base stamping 104b is provided with a pilot 120. The pilot 120 is formed from a cylindrical wall which extends downwardly from the bottom wall 108b of the base portion 106b. The outer diameter of the pilot wall is slightly less than the inner diameter of the bore through the brake shoe. The pilot 120 has a passageway 122 therethrough which is aligned with the bore through the bottom wall 108b of the base portion 106b. When used, the pilot 120 is seated in the bore through the brake shoe to aid in maintaining engagement of the spring and cup assembly 50b with the brake drum shoe assembly and provides a pivot surface for linkages used within the brake assembly 50b. The pilot 120 can be easily released from the brake shoe by pulling the pilot 120 out from the bore in the brake shoe.

In addition, as shown in FIG. 11, the side wall 74b of the retainer cup 70b is tapered from the rim 78b down to the indents 90b, 92b thereby basically eliminating the bottom wall of the cup 70b. It is to be understood that the side wall in this embodiment could instead be cylindrically shaped and a bottom wall could be provided in accordance with the other embodiments described herein.

The above-described embodiments of the novel preassembled and preloaded spring and retainer cup assembly eliminate the push down and twist motions from the installation of the brake shoe retention spring. The assembly can be easily done without a special hand tool as required by the prior art. The T-shaped slot in the retainer cup permits positioning of the brake shoe pin without using a twisting motion.

While preferred embodiments of the present invention are shown and described, it is envisioned that those skilled in the art may devise various modifications of the present invention without departing from the spirit and scope of the appended claims.

The invention claimed is:

1. A spring and cup assembly for use in a brake assembly, comprising: a cup, a spring having first and second ends, said cup being preassembled with and engaged against said first end of said spring, and structure for initially retaining said spring in a compressed condition with said cup prior to engagement of and actual installation of said spring and cup assembly with the brake assembly to define a preassembled, preloaded spring and cup assembly.

2. A spring and cup assembly as defined in claim 1, wherein said cup includes a slot therethrough and further including a pin, said pin being passed through said slot in said cup to retain said pin with said cup.

3. A spring and cup assembly as defined in claim 2, wherein said cup includes at least one indent, said pin being releasably retained in said at least one indent.

4. A spring and cup assembly as defined in claim 2 in combination with a brake assembly, wherein said brake assembly comprises a brake shoe mounting plate and a brake shoe, said brake shoe mounting plate having a bore therethrough and said brake shoe having a bore therethrough, said second end of said spring in said preassembled spring and cup assembly being proximate to said brake shoe, said pin passing through said bores provided in said brake shoe mounting plate and said brake shoe, said pin flirter being releasably engaged with said cup in said preassembled spring and cup assembly to assemble said preassembled spring and cup assembly with said brake shoe mounting plate and said brake shoe.

5. The combination as defined in claim 4, wherein said cup includes a slot therethrough, said pin further being passed through said slot in said cup to releasably retain said pin with said cup.

6. The combination as defined in claim 5, wherein said cup includes at least one indent, said pin being releasably retained in said at least one indent.

7. A spring and cup assembly as defined in claim 1, wherein said retaining structure is capable of being released to allow said spring to expand.

8. A spring and cup assembly as defined in claim 7, further including a pin, said pin being selectively engageable with said cup and being used to release said retaining structure.

9. A spring and cup assembly as defined in claim 7, wherein said retaining structure comprises at least one arm portion which is associated with said second end of the spring, said arm portion being selectively engagable with said cup to maintain said spring in said compressed condition and releasable from said engagement with said cup to allow said spring to expand.

10. A spring and cup assembly as defined in claim 9, wherein said cup includes an opening therethrough, said arm portion passing through said opening in said cup and being releasably engaged with said cup, such that a pin may be used to dislodge said arm portion from engagement with said cup.

11. A spring and cup assembly as defined in claim 10, further including a bridge provided in said cup, said opening and said slot being separated from each other by said bridge, such that a pin may be engaged with said cup through said slot.

12. A spring and cup assembly as defined in claim 10, wherein said arm portion is integrally formed with said second end of said spring.

13. A spring and cup assembly for use in a brake assembly, comprising: a cup, a spring having first and second ends, said cup being preassembled with and engaged against said first end of said spring, and structure for initially retaining said spring in a compressed condition with said cup prior to installation of said spring and cup assembly with the brake assembly to define a preassembled, preloaded spring and cup assembly, said retaining structure being capable of being released to allow said spring to expand and said retaining structure includes a base portion and at least one arm portion which extends from said base portion, said base portion being connected to said second end of said spring, said at least one arm portion being released from engagement with said cup by pressing on said cup to compress said spring so as to allow said at least one arm portion to move away from engagement with said cup.

14. A spring and cup assembly as defined in claim 13, wherein said base portion further includes a pilot which extends therefrom on an opposite side of said base portion than said arm portions, said pilot being engaged in a bore provided through a brake shoe in said brake assembly.

15. A spring and cup assembly in combination with a brake assembly, said brake assembly comprising: a brake shoe mounting plate and a brake shoe; said brake shoe mounting plate having a bore therethrough and said brake shoe having a bore therethrough, said spring and cup assembly comprising: a cup having a slot therethrough; a spring, said spring being positioned between said brake shoe and said cup and being preassembled with said cup; structure for initially retaining said spring in a compressed condition between said cup and said brake shoe, said retaining structure retaining said spring in a compressed condition with said cup prior to installation of said spring and cup assembly with said brake shoe; and a pin, said pin passing through said bores provided in said brake shoe mounting plate and said brake shoe, said pin further passing through said cup to assemble said preassembled spring and cup with said brake shoe mounting plate and said brake shoe, said retaining structure being selectively releasable to allow said spring to expand.

16. A method of preassembling a spring and cup assembly for use with a brake assembly comprising the steps of: providing a cup, a spring and structure for selectively retaining said spring in a compressed condition; engaging said cup with a first end of said spring; and compressing said spring and engaging said retaining structure to maintain the compressed condition of said spring prior to engagement of and actual installation of said spring and cup assembly with the brake assembly.

17. A method of preassembling a spring and cup assembly for use with a brake assembly comprising the steps of: providing a cup, a spring and structure for selectively retaining said spring in a compressed condition; engaging said cup with a first end of said spring by providing at least one arm portion which is associated with a second end of said spring and engaging said at least one arm portion with said cup to maintain said spring in said compressed condition; and compressing said spring and engaging said retaining structure to maintain the compressed condition of said spring prior to installation of said spring and cup assembly with the brake assembly.

18. A method of assembling a spring and cup assembly with a brake assembly comprising the steps of.
   providing said brake assembly comprising a brake shoe and a brake shoe mounting plate, said brake shoe having a bore therethrough and said brake shoe mounting plate having a bore therethrough;

preassembling said spring and cup assembly by engaging a spring with a cup, and engaging at least one arm portion which is associated with an end of said spring with said cup to selectively retain said spring in a compressed condition prior to installation of said spring and cup assembly with said brake shoe;

placing said preassembled spring and cup assembly against said brake shoe such that said end of said spring is proximate to said brake shoe;

engaging a pin through said bores in said brake shoe and said brake shoe mounting plate;

engaging said pin with said cup; and releasing said at least one arm portion to allow said spring to expand.

19. A method as defined in claim 18, wherein the step of releasing said at least one arm portion to allow said spring to expand comprises moving said pin against said at least one arm portion to cause said at least one arm portion to release from engagement with said cup.

20. A method as defined in claim 18, wherein the step of releasing said at least one arm portion to allow said spring to expand comprises pressing on said cup to compress said spring to cause said at least one arm portion to release from engagement with said cup.

21. A method of assembling a spring and cup assembly with a brake assembly comprising the steps of:

providing said brake assembly comprising a brake shoe mounting plate and brake shoe;

providing a preassembled spring and cup assembly, said preassembled spring and cup assembly comprising a spring, a cup mounted on said spring, and structure for selectively retaining said spring in a compressed condition prior to engagement of and actual installation of said spring and cup assembly with said brake assembly;

compressing said spring and engaging said retaining structure to maintain said spring in a compressed condition prior to installation of said spring and cup assembly with said brake assembly;

placing said preassembled spring and cup assembly against said brake shoe;

providing a pin;

passing said pin through a bore provided in said brake shoe mounting plate and in said brake shoe; and attaching said pin to said cup.

22. A preloaded spring and cup assembly for use in a brake assembly, comprising a spring member having a first end and a second end, a cup engaged with the first end of the spring, and structure associated with the second end of the spring engaging said cup to maintain the spring in a compressed, preloaded condition prior to engagement of and actual installation of said spring and cup assembly with the brake assembly, said structure being releasable from said cup to permit the spring to at least partially expand.

23. A preloaded spring and cup assembly for use in a brake assembly, comprising a spring member having a first end and a second end, a cup engaged with the first end of the spring, and structure associated with the second end of the spring comprising an arm portion integrally formed with said second end of said spring and extending from said second end of said spring to said cup for engaging said cup to maintain the spring in a compressed, preloaded condition prior to installation of said spring and cup assembly with the brake assembly, said structure being releasable from said cup to permit the spring to at least partially expand.

24. A preloaded spring and cup assembly for use in a brake assembly, comprising a spring member having a first end and a second end, a cup engaged with the first end of the spring, and structure associated with the second end of the spring comprising a base stamping and at least one arm portion extending upwardly from said base stamping for engaging said cup to maintain the spring in a compressed, preloaded condition prior to installation of said spring and cup assembly with the brake assembly, said at least one arm portion normally being biased outwardly from said base stamping and being resiliently deformed so as to engage said cup, said structure being releasable from said cup to permit the spring to at least partially expand.

25. A preloaded spring and cup assembly as defined in claim 24, wherein said second end of said spring is seated against said base stamping.

26. A preloaded spring and cup assembly as defined in claim 22, further including a pin which is assembled with said cup.

\* \* \* \* \*

UNITED STATES PATENT AND TRADEMARK OFFICE
CERTIFICATE OF CORRECTION

PATENT NO. : 5,836,429
DATED : November 17, 1998
INVENTOR(S) : James T. McGuire

It is certified that error appears in the above-identified patent and that said Letters Patent is hereby corrected as shown below:

Column 4, Line 10 "the end" should be -- the --

Column 11, Line 29 "flirter" should be -- further --

Signed and Sealed this

First Day of June, 1999

Attest:

Q. TODD DICKINSON

*Attesting Officer*  *Acting Commissioner of Patents and Trademarks*